United States Patent
McCarthy et al.

(12)

(10) Patent No.: US 12,404,470 B2
(45) Date of Patent: *Sep. 2, 2025

(54) SYSTEMS AND METHODS FOR COLLECTING AND TRANSPORTING BIOFUEL COMPONENTS

(71) Applicants: Martin Franklin McCarthy, Charlotte, NC (US); Sean Thomas McCarthy, Charlotte, NC (US)

(72) Inventors: Martin Franklin McCarthy, Charlotte, NC (US); Sean Thomas McCarthy, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,474

(22) Filed: Dec. 23, 2024

(65) Prior Publication Data
US 2025/0122439 A1    Apr. 17, 2025

Related U.S. Application Data

(63) Continuation-in-part of application No. 18/812,550, filed on Aug. 22, 2024, which is a
(Continued)

(51) Int. Cl.
*C10L 5/36* (2006.01)
*C10L 5/06* (2006.01)
(Continued)

(52) U.S. Cl.
CPC .............. *C10L 5/368* (2013.01); *C10L 5/06* (2013.01); *C10L 5/361* (2013.01); *C10L 5/363* (2013.01);
(Continued)

(58) Field of Classification Search
CPC .. C10L 5/368; C10L 5/06; C10L 5/361; C10L 5/363; C10L 5/365; C10L 5/44;
(Continued)

(56) References Cited

U.S. PATENT DOCUMENTS

| 3,678,662 A | 7/1972 | Grote |
| 3,862,963 A | 1/1975 | Hoshi et al. |

(Continued)

FOREIGN PATENT DOCUMENTS

| CA | 2777850 A1 | 11/2013 |
| CA | 2931443 A1 | 11/2017 |

(Continued)

OTHER PUBLICATIONS

International Search Report (ISR) and Written Opinion (WO) for PCT/EP/2022/021203 mailed Jul. 21, 2022 (13 pages.).

(Continued)

*Primary Examiner* — Cephia D Toomer
(74) *Attorney, Agent, or Firm* — Samantha Summer; Shumaker, Loop & Kendrick, LLP

(57) ABSTRACT

A method of capturing and disposing of fats, oil and/or grease ("FOG") is disclosed. The method includes: providing a porous container formed of a porous fabric, wherein the porous container is filled with an absorbent material capable of absorbing a quantity of the fats, oil, and/or grease through the porous fabric of the porous container; placing the porous container and the absorbent material contained therein in a grease trap; allowing the grease trap to fill up with water and a mixture of fats, oil, and/or grease; removing the fats, oil, and/or grease from the grease trap after a pre-determined period of time, while the water remains in the grease trap; and transporting the fats, oil, and/or grease. The fats, oil, and/or grease may be removed from the grease trap and transported with a vacuum truck.

19 Claims, 13 Drawing Sheets

Related U.S. Application Data continuation-in-part of application No. 18/747,896, filed on Jun. 19, 2024, now Pat. No. 12,173,244, which is a continuation-in-part of application No. 18/214,041, filed on Jun. 26, 2023, now Pat. No. 12,043,811, which is a continuation of application No. 18/081,295, filed on Dec. 14, 2022, now Pat. No. 11,713,429, which is a continuation of application No. 17/685,565, filed on Mar. 3, 2022, now Pat. No. 11,535,804, which is a continuation-in-part of application No. 17/514,105, filed on Oct. 29, 2021, now Pat. No. 11,339,341, which is a continuation-in-part of application No. 17/362,168, filed on Jun. 29, 2021, now Pat. No. 11,529,571.

(60) Provisional application No. 63/164,761, filed on Mar. 23, 2021.

(51) Int. Cl.
  *C10L 5/44* (2006.01)
  *C10L 5/46* (2006.01)

(52) U.S. Cl.
  CPC .......... *C10L 5/365* (2013.01); *C10L 5/44* (2013.01); *C10L 5/46* (2013.01); *C10L 2200/0484* (2013.01); *C10L 2230/02* (2013.01); *C10L 2290/22* (2013.01)

(58) Field of Classification Search
  CPC .......... C10L 5/46; C10L 2200/0484; C10L 2230/02; C10L 2290/22
  See application file for complete search history.

(56) References Cited

U.S. PATENT DOCUMENTS

| | | | |
|---|---|---|---|
| 4,378,229 A | 3/1983 | Leen | |
| 4,925,343 A | 5/1990 | Raible et al. | |
| 5,264,134 A | 11/1993 | McCamy | |
| 5,716,840 A | 2/1998 | Kahler | |
| 5,744,406 A | 4/1998 | Novak | |
| 5,820,762 A | 10/1998 | Bamer | |
| 6,010,558 A | 1/2000 | Ackland | |
| 6,365,214 B1 | 4/2002 | Kirk | |
| 6,508,849 B1 | 1/2003 | Comas | |
| 6,517,709 B1 | 2/2003 | Cardwell et al. | |
| 6,818,027 B2 | 11/2004 | Murcia | |
| 7,354,516 B1 | 4/2008 | Young et al. | |
| 7,597,727 B1 | 10/2009 | Morris | |
| 10,066,178 B2 | 9/2018 | Tanel | |
| 10,882,758 B2 | 1/2021 | Sands | |
| 11,339,341 B1 | 5/2022 | McCarthy | |
| 11,529,571 B2 | 12/2022 | McCarthy | |
| 11,535,804 B2 | 12/2022 | McCarthy | |
| 11,535,805 B2 | 12/2022 | McCarthy | |
| 11,535,812 B2 | 12/2022 | McCarthy | |
| 2001/0023007 A1 | 9/2001 | Leriget | |
| 2003/0079400 A1 | 5/2003 | Weissman et al. | |
| 2003/0121802 A1 | 7/2003 | MacQuoid | |
| 2004/0035046 A1 | 2/2004 | Weissman et al. | |
| 2004/0161606 A1 | 8/2004 | Bilkey | |
| 2005/0268542 A1 | 12/2005 | Weissman et al. | |
| 2006/0000767 A1 | 1/2006 | Trauger et al. | |
| 2006/0156621 A1 | 7/2006 | Kraus et al. | |
| 2006/0230673 A1 | 10/2006 | Barford et al. | |
| 2007/0029247 A1 | 2/2007 | Alpert | |
| 2007/0169409 A1 | 7/2007 | Chang | |
| 2009/0014087 A1 | 1/2009 | Fevag | |
| 2009/0200241 A1 | 8/2009 | Harman et al. | |
| 2011/0000854 A1 | 1/2011 | Nichols et al. | |
| 2012/0006761 A1 | 1/2012 | Parker et al. | |
| 2012/0251597 A1 | 10/2012 | Gupta et al. | |
| 2012/0311972 A1 | 12/2012 | Hunter | |
| 2013/0056369 A1 | 3/2013 | Jorgensen | |
| 2014/0087315 A1 | 3/2014 | Doyle et al. | |
| 2015/0322361 A1 | 11/2015 | Creutzmann | |
| 2017/0081251 A1 | 3/2017 | Townsend | |
| 2017/0226440 A1 | 8/2017 | Fandrich et al. | |
| 2019/0017605 A1 | 1/2019 | Miller et al. | |
| 2019/0040593 A1 | 2/2019 | Tetrault et al. | |
| 2021/0002571 A1 | 1/2021 | Zeitler et al. | |
| 2021/0070640 A1 | 3/2021 | Yaman et al. | |
| 2023/0183602 A1 | 6/2023 | McCarthy | |

FOREIGN PATENT DOCUMENTS

| | | | |
|---|---|---|---|
| CN | 110041907 A | 7/2019 | |
| CN | 213253724 U | 5/2021 | |
| DE | 102009013985 A1 | 9/2010 | |
| DE | 102012104574 A1 | 12/2013 | |
| DE | 202014001312 U1 | 3/2014 | |
| DE | 202019003324 U1 | 8/2019 | |
| EP | 2216387 A1 | 8/2010 | |
| EP | 3750853 A1 | 12/2020 | |
| FR | 2989384 A1 | 10/2013 | |
| GB | 2368261 A | 5/2002 | |
| GB | 2389858 B | 1/2005 | |
| JP | 2014151317 A | 8/2014 | |
| KR | 10-1953361 B1 | 2/2019 | |
| SU | 1667805 A1 * | 8/1991 | |
| WO | 2007009249 A1 | 1/2007 | |
| WO | 2008141752 A1 | 11/2008 | |
| WO | 2012062324 A1 | 5/2012 | |
| WO | 2013108223 A1 | 7/2013 | |
| WO | 2014-068316 A1 | 5/2014 | |
| WO | 2017152229 A1 | 9/2017 | |
| WO | 2019145944 A1 | 8/2019 | |

OTHER PUBLICATIONS

Mathavan, G.N. et al. 1989. Use of peat in the treatment of oily waters. Water, Air, and Soil Pollution 45: 17-26. (Year: 1989).

Pintor, A.M.A. 2016. Oil and grease removal from wastewaters. Sorption treatment as an alternative to state-of-the-art technologies. A critical review. Chemical Engineering Journal 297 (20216) 229-255 (Year: 2016).

Non-Final Office Action issued for U.S. Appl. No. 17/362,168, mailed Jul. 20, 2022 (9 pages).

Non-Final Office Action issued for U.S. Appl. No. 17/736,601, mailed Jul. 22, 2022 (17 pages).

Non-Final Office Action issued for U.S. Appl. No. 17/685,565, mailed Aug. 17, 2022 (21 pages).

International Search Report (ISR) and Written Opinion (WO) for PCT/EP2022/021205 mailed Jun. 8, 2022 (9 pages).

Olga et al., Cleanup of Water Surface from Oil Spills Using Natural Sorbent Materials, National Research Tomsk Polytechnic University, Procedia Chemistry 10 (2014), pp. 145-150.

City of Dothan Alabama, Fats, Oils and Grease (FOG) Science, dated Oct. 27, 2020, Retrieved from https:/www.dothan.org/DocumentCenterNiew/3032/FOG--Science?bidld, 7 pages.

Finney et al., 2009 "Fuel pelletization with a binder: part I—identification of a suitable binder for spent mushroom compost-coal tailing pellets". Energy & Fuels 23, 3195-3202. (Year: 2009).

Abomohra et al. 2020 "Potential of fat, oil and grease (FOG) for biodiesel production: A critical review on the recent progress and future perspectives" Progress in Energy and Combustion Science 81 (Year: 2020).

Notice of Allowance (NOA) issued for U.S. Appl. No. 17/362,168, mailed Oct. 31, 2022 (10 pages).

Final Rejection issued for U.S. Appl. No. 17/685,565, mailed Sep. 23, 2022 (8 pages).

Notice of Allowance (NOA) issued for U.S. Appl. No. 17/685,565, mailed Oct. 31, 2022 (9 pages).

Corrected Notice of Allowance (NOA) issued for U.S. Appl. No. 17/685,565, mailed Nov. 3, 2022 (9 pages).

Final Rejection issued for U.S. Appl. No. 17/736,601, mailed Sep. 23, 2022 (9 pages).

(56) References Cited

OTHER PUBLICATIONS

Notice of Allowance (NOA) issued for U.S. Appl. No. 17/736,601, mailed Oct. 31, 2022 (9 pages).
Non-Final Office Action issued for U.S. Appl. No. 17/685,585, mailed Jul. 20, 2022 (11 pages).
Notice of Allowance (NOA) issued for U.S. Appl. No. 17/685,585, mailed Nov. 2, 2022 (11 pages).
U.S. Final Rejection issued for U.S. Appl. No. 18/081,295, mailed Mar. 3, 2023 (15 pages).
Notice of Allowance (NOA) issued for U.S. Appl. No. 18/081,290, mailed Feb. 14, 2023 (12 pages).
Notice of Allowance (NOA) issued for U.S. Appl. No. 18/081,295, mailed Apr. 5, 2023 (7 pages).
U.S. Non-Final Office Action for U.S. Appl. No. 18/081,295 mailed Feb. 2, 2023 (24 pages).
Notice of Allowance (NOA) issued for U.S. Appl. No. 18/105,130 mailed Aug. 21, 2023 (8 pages).
Non-Final Office Action (NFOA) issued for U.S. Appl. No. 18/105,130 mailed Jun. 26, 2023 (12 pages).
Hendrasarie et al. 2021 "Combining grease trap and Moringa Oleifera </i> as adsorbent to treat wastewater restaurant" South African Journal of Chemical Engineering 37 (2021) 196-205 (Year: 2021).
Anonymous: "Peat Sorb Safety Data Sheet (SDS)" Cited in EP22776410.7; provided herein per MPEP 609.04(a)III. Date unknown.
Extended European Search Report Issued On Apr. 30, 2025 For EP22776410.7 (13 Pages).

\* cited by examiner

SYSTEMS AND METHODS FOR COLLECTING AND TRANSPORTING BIOFUEL COMPONENTS

TECHNICAL FIELD

The present invention relates to collecting and transporting a biofuel product having fat, oil and/or grease components.

BACKGROUND

The National Pretreatment Program implements Clean Water Act requirements to control pollutants that are introduced into publicly owned treatment works ("POTWs"). As part of this program, EPA has promulgated General Pretreatment Regulations that require the establishment of State and local pretreatment programs to control pollutants, which pass through or interfere with POTW treatment processes or may contaminate POTW sewage sludge. Meeting these requirements may require elimination of interference caused by the discharge to POTWs of Fat, Oil, and Grease (FOG) from food service establishments (FSE). More specifically, the Pretreatment Program regulations at 40 CFR § 403.5(b)(3) prohibit "solid or viscous pollutants in amounts which will cause obstruction" in the POTW and its collection system. EPA's Report to Congress on combined sewer overflows (CSOs) and sanitary sewer overflows (SSOs) identified that "grease from restaurants, homes, and industrial sources are the most common cause (47%) of reported blockages. Grease is problematic because it solidifies, reduces conveyance capacity, and blocks flow."

Further limiting FOG discharges will help POTWs prevent blockages that impact CSOs and SSOs, which cause public health and water quality problems.

FOG wastes are generated at food service establishments as byproducts from food preparation, and cleaning activities for pans, dishes, utensils and other surfaces. FOG captured on site is generally classified into two broad categories. The first type is yellow grease that is the byproduct of deep-frying, and often captured in large containers, then ultimately sold into the reuse market. The second type of FOG are the fat, oil and grease that are washed down the sink and floor drains into the Grease Trap. These fats, oils and grease are a result of cleaning pans, plates, utensils and other grease-laden surfaces in the food service establishment. The annual production of grease trap waste is massive. Currently the EPA estimates between 23,000 and 75,000 Sanitary Sewer Overflows per year. Food service establishments create volumes of FOG that run from 800 to 1,700 pounds per year. Furthermore, one source indicates that Americans produce 13 pounds of F.O.G. per capita per year.

Food service establishments can adopt a variety of best management practices or install interceptor/collector devices to control and capture the FOG material before discharge to the POTW collection system. For example, instead of discharging yellow grease to POTWs, food service establishments often accumulate this material for pick up by consolidation service companies for re-sale or re-use in the manufacture of tallow, animal feed supplements, fuels, or other products.

Additionally, food service establishments can install interceptor/collector devices (e.g., grease traps) in order to accumulate FOG on-site and prevent it from entering the POTW collection system. In many cases, an establishment that implements best management practices will realize financial benefit through a reduction in their required grease interceptor and trap maintenance frequency.

Likewise, more and more POTWs are addressing FOG discharges by imposing mandatory measures of various types, including inspections, periodic grease pumping, stiff penalties, and even criminal citations for violators, along with 'strong waste' monthly surcharges added to restaurant sewer bills.

As a separate matter, large quantities of motor vehicle oils and lubricants also end up in water supplies for various reasons. Motor vehicle oils and lubricants thus fall within the definition of fats, oils and/or grease as used in this application.

Pretreatment programs are developing and using inspection checklists for both food service establishments and POTW pretreatment inspectors to control FOG discharges. Additionally, EPA identified typical numeric local limits controlling oil and grease in the range of 50 mg/L to 450 mg/L with 100 mg/L as the most commonly reported numeric pretreatment limit.

With this information in mind, it is apparent that while there has been some progress in collecting and disposing of FOG, much more needs to be done. In particular, there is a need for a safe and effective method of transporting the biofuel product composed largely of FOG and similar natural, biodegradable materials having high energy density such that the FOG is usable as fuel in a wide variety of applications and at low cost.

SUMMARY

Accordingly, there is a need for improved methods of removing FOG from grease traps. The disclosed methods improve the efficiency of grease traps as well as repurpose FOG as a biofuel.

In one aspect, a method of capturing fats, oils, and/or grease (FOG) is disclosed. The method comprises: (a) providing a porous container formed of a porous fabric and comprising a plurality of pores with an apparent opening size of 0.25 mm to 0.5 mm; (b) placing the porous container in a grease trap; (c) allowing the grease trap to fill up with water and FOG; (d) after a pre-determined time, removing the FOG from the grease trap while the water remains in the grease trap; and (e) transporting the FOG.

In some aspects, the porous container is placed in a primary compartment of the grease trap. The porous container in the primary compartment may be freely floating.

Additionally, the porous container may be placed in a secondary compartment of the grease trap. In preferred embodiments, the porous container is tethered with a cord, or bracket, to remain proximate to the grease trap exit requiring all water and/or FOG to pass through the porous container before it enters the sewer pipe.

In some aspects, the method includes, before step (d), visually assessing a volume of the grease trap and the fats, oil, and/or grease relative to the water therein to determine an amount of the fats, oil, and/or grease to be removed from the grease trap.

In some aspects, step (d) further comprises applying a positive pressure using a positive pressure pump into the mixture of separated water and fats, oil, and/or grease therein to aid and facilitate removing the fats, oil, and/or grease from the grease trap during step (d) by maintaining the fats, oil, and/or grease on an uppermost surface of the separated water that remains in the grease trap.

In some aspects, the method further comprises, after step (e), at a secondary location, combining the collected FOG from the grease trap with a second porous container having absorbent material therein to create a biofuel. In some aspects, the method further comprises, after step (e), combining the collected FOG from the grease trap with loose absorbent material to create a biofuel.

In some aspects, the method includes removing the FOG from the grease trap using a vacuum truck. In some aspects, the vacuum truck includes a tank with loose absorbent material therein, or with a second porous container therein for forming a biofuel within the tank of the vacuum truck.

In another aspect, a method of capturing and disposing of FOG using a vacuum truck is disclosed. The method comprising: (a) providing a porous container formed of a porous fabric and comprising a plurality of pores with an apparent opening size of 0.25 mm to 0.5 mm; (b) placing the porous container in a grease trap; (c) allowing the grease trap to fill up with water and FOG; (d) after a pre-determined time, vacuuming the FOG from the grease trap using a vacuum truck while the water remains in the grease trap; and (e) transporting the FOG using the vacuum truck.

In some aspects, the method further includes: after step (e), discharging the contents of the vacuum truck into a containment device containing the second porous container with the second batch of absorbent material contained therein, the loose absorbent material, or a combination thereof at the secondary location, thereby forming a biofuel; the biofuel comprising the second porous container with the second batch of absorbent material contained therein, the loose absorbent material, or a combination thereof and the fats, oil, and/or grease absorbed therein.

In some aspects, the method further includes: after step (e), discharging the contents of the vacuum truck at a secondary location, wherein the contents of the vacuum truck comprise a biofuel; the biofuel comprising the second porous container with the second batch of absorbent material contained therein, the loose absorbent material, or a combination thereof and the fats, oil, and/or grease absorbed therein.

In some aspects, the method further includes, after step (e), discharging the FOG at a secondary location for processing as feedstock for biodiesel.

In one example, porous container is used to contain sphagnum peat or mushroom compost materials, and to maximize contact surface area with the FOG materials in, for example, a grease trap. The sphagnum peat, mushroom compost, and/or orange peels is obtained from select locations in the United States or Canada known for this type of specialized product. As used in this application, peat, mushroom and similar materials into which the FOG is absorbed are referred to generally and broadly as "capture materials" or absorbent materials. In certain aspects, it is contemplated that orange peels may be used as a capture or absorbent material. Likewise, the absorbent material may be a polymeric material such as a polyolefinic material and more preferably a polypropylene having oleophilic and hydrophobic properties that are ideal to absorb fat, oil, and/or grease.

These and other objects and advantages are achieved by providing a biofuel product having constituents selected from the group consisting of fat, oil and/or grease components, a container formed of a biodegradable material having a multiplicity of openings of a size and shape adapted for allowing the fat, oil and/or grease components to pass through the openings to an interior area of the container, an absorbent capture material positioned in the container and holding a quantity of the fat, oil and/or grease, the container, capture material and fat, oil and/or grease collectively comprising the biofuel product.

According to another aspect of the invention, the container includes a tether, or holding device, such as a bracket, for positioning the container at an effluent end of a source of fat, oil and/or grease during absorption of the fat, oil or grease into the capture material to ensure that all water must pass through the container, and the absorbent material therein, prior to exiting to the sewer.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed.

DETAILED DESCRIPTION

Figure 1:
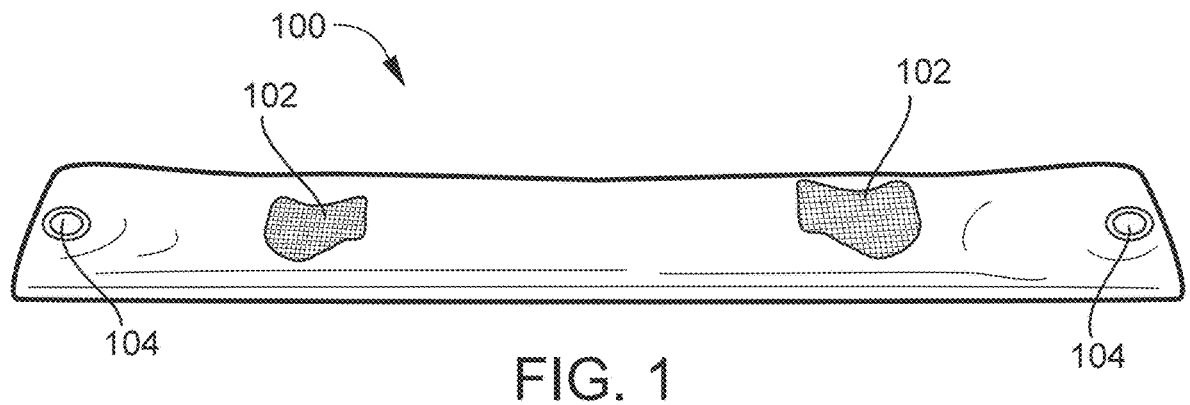
FIG. 1 is a perspective view of the geotextile container in tube form according to an embodiment of the invention.
Figure 2:
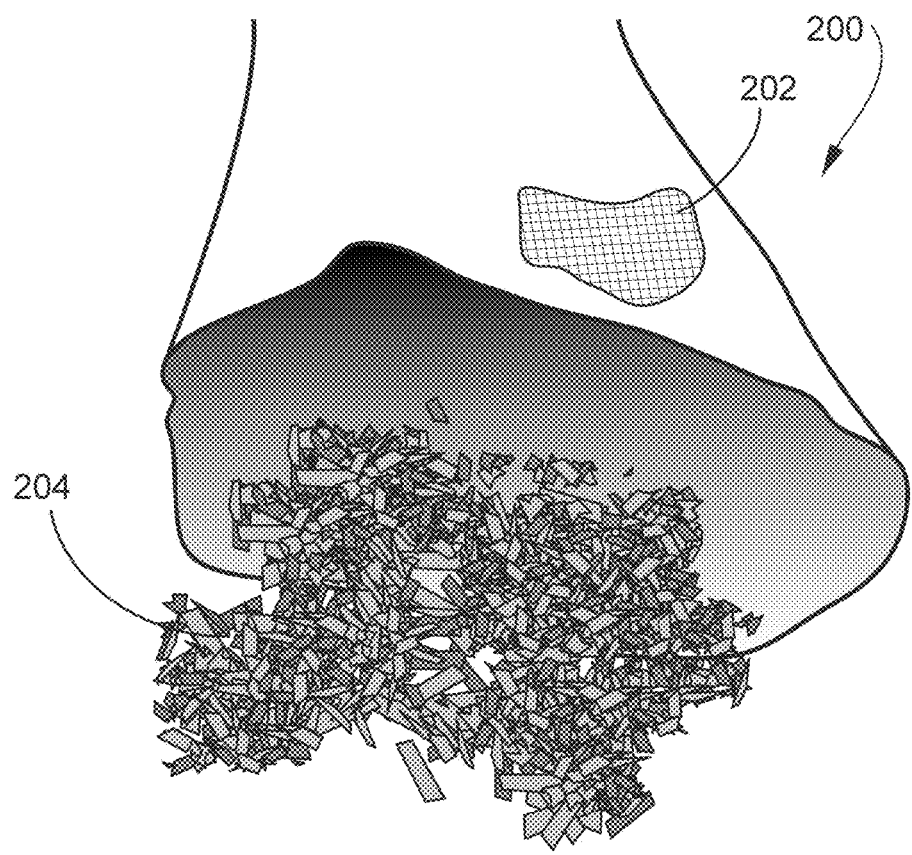
FIG. 2 is a fragmentary, enlarged end view of the tube of FIG. 1, shown in an open position for receiving a quantity of sphagnum peat material or other absorbent material.

Referring now to the drawings, a container in the form of a tube 100/200 for use in the present invention is shown in the FIGS. 1-2, as noted. The tube 100/200 may be constructed according to many suitable constructions, but one construction comprises an elongate tube 100/200 that is formed of a geotextile fabric 102/202 that may be constructed by circular knitting, flat knitting, weaving, nonwoven formation or any other fabric construction having a multitude of openings through the thickness of the fabric 102/202. The fabric 102/202 is preferably seamed along its length or circular knitted to form the tube 100/200. The tube 100/200 is preferably constructed of a biodegradable or natural material that will combust with minimal residue. The fabric 102/202 of the tube 100/200 may be constructed of any suitable natural or biodegradable yarn, for example, with a natural fiber such as cotton, hemp, ramie, jute or similar material because of its biodegradable characteristics, with apparent opening size (AOS) on the order of 0.25 to 0.5 mm depending on the size of the sphagnum peat absorbent material, mushroom compost absorbent material, orange peels as absorbent material, and/or the polypropylene absorbent material positioned therein (as the absorbent material 204). The empty tube 100/200 may be any suitable length and diameter, for example, 60 cm to 120 cm long and 7 cm to 15 cm in diameter depending on the size of the grease trap and the FOG loading from the restaurant or vehicle repair facility. As manufactured, the tube 100/200 is preferably closed at one end and filled from the opposite, open end. The open end of the filled tube 100/200 may be closed with any suitable closure, such as stitching, clips or tied off with cord at the top of the grease trap or other FOG separating and collection structure.

The tube 100 may include an opening 104 on either or both ends to receive a cord, as shown in FIG. 1, by which the tube 100 may be lowered into and retrieved from a grease trap or other enclosure and tethered to the grease trap or other structure while in use.

One or more coatings may be applied to the fabric 102/202 to prevent penetration of the fabric 102/202 surface by water or aqueous salts thereby allowing the fabric 102/202 substrate to be non-absorbent for water or soluble salts.

Figure 3:
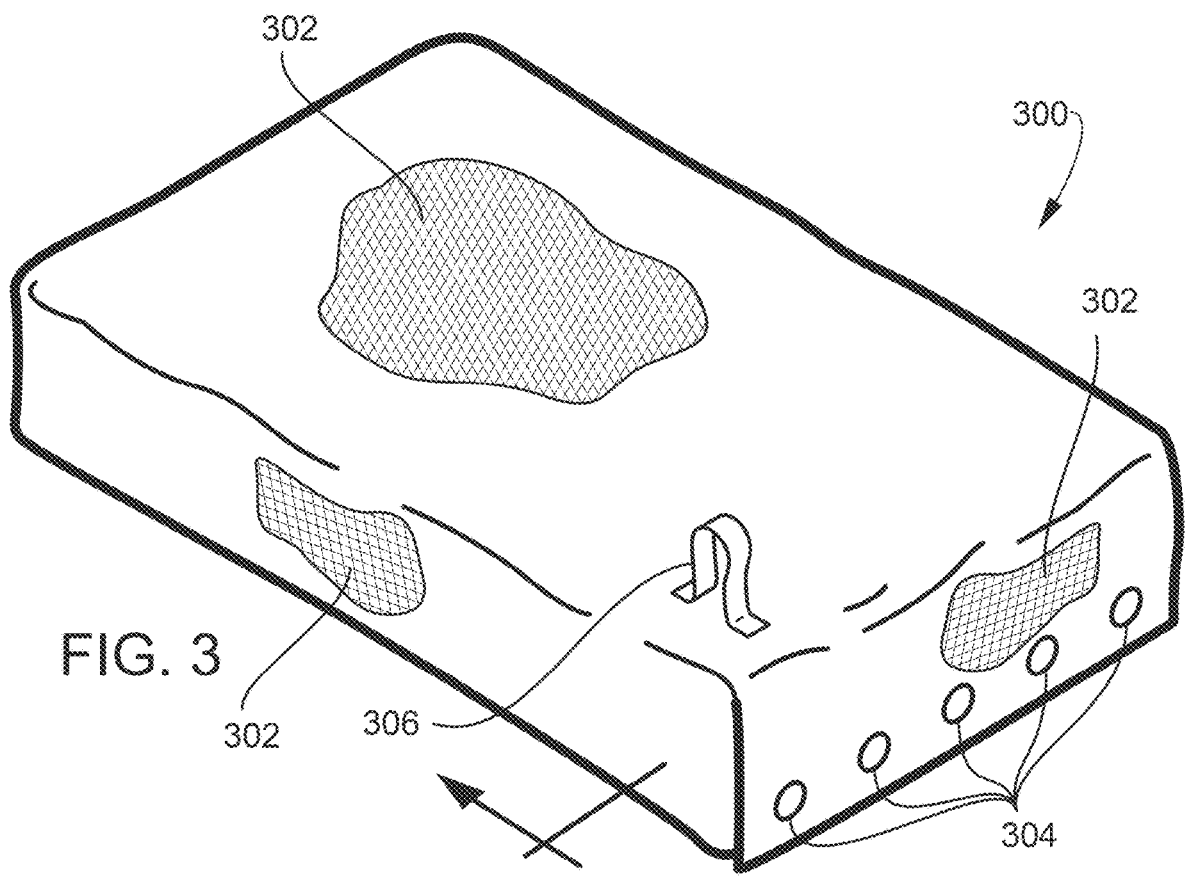
FIG. 3 is a perspective view of a geotextile container in mat form according to an embodiment of the invention.
Figure 4:
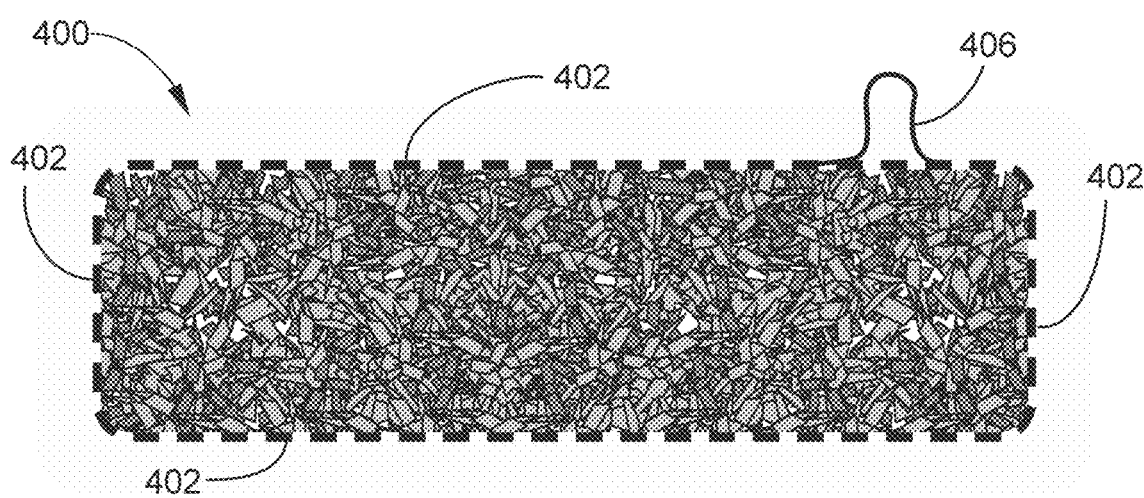
FIG. 4 is a vertical cross-section of the geotextile mat with sphagnum peat material or other absorbent material contained in the mat.

Referring now to FIGS. 3 and 4, a container in the form of a mat 300/400 for use in the present invention is shown in the FIGS. 3-4, as noted. The mat 300/400 may be constructed according to many suitable constructions, but one construction comprises a rectangular "box" shape that is formed of a geotextile fabric 302/402 that may be constructed by circular knitting, flat knitting, weaving, nonwoven formation or any other fabric construction having a multitude of openings through the thickness of the fabric. The fabric 302/402 is preferably seamed along its length and width to form the mat 300/400. The mat 300/400 may be constructed of a synthetic, biodegradable or natural material. The fabric 302/402 of the mat may be constructed of any suitable natural or biodegradable/synthetic yarn, for example, a natural fiber such as cotton, hemp, ramie, jute or similar material because of its biodegradable characteristics, with apparent opening size (AOS) on the order of 0.25 to 0.5 mm depending on the size of the sphagnum peat or mushroom compost absorbent material. The empty mat 300/400 may be any suitable length, width and height, for example, 60 cm to 120 cm long, 30 cm to 60 cm long and 10 cm to 20 cm in height depending on the size of the grease trap and the FOG loading from the restaurant or vehicle oils from the vehicle repair facility. As manufactured, the mat 300/400 is preferably closed at one end and filled from the opposite, open end. The open end of the filled mat may be closed with any suitable closure, such as stitching, clips, or snaps 304. The mat 300/400 may be seamed in such manner as to create individual compartments within the mat.

The mat 300/400 may include a loop 306/406 to receive a cord by which the mat may be lowered into and retrieved from a grease trap or other enclosure and tethered in front of the sewer pipe in the grease trap so that all water emitted from the grease trap passes through the container before entering the sewer.

One or more coatings may be applied to the fabric 302/402 to prevent penetration of the fabric surface by water or aqueous salts thereby allowing the fabric substrate to be non-absorbent for water or soluble salts.

Several products suitable for use in the FOG tube described in this application are "Dry All" wood fiber, sphagnum peat moss processed and sold by Integrity Absorbent Products or shredded mushrooms. In particular, the peat moss product is an all-organic hydrocarbon absorbent, manufactured from large fiber sphagnum peat moss. The manufacturing process produces a product which becomes both oleophilic, absorbing hydrocarbons and hydrophobic, i.e., repelling water. Due to its fibrous structure and processing, peat absorbs hydrocarbons quickly on contact by virtue of its wicking capillary action and encapsulates oil on contact. This makes peat ideal for hydrocarbon cleanup both on open water and land applications. Peat absorbs up to eight times its weight. This volume will vary based on the hydrocarbon being absorbed and the temperature. In certain aspects, orange peels have the same oleophilic and hydrophobic characteristics as those mentioned above.

This type of natural cleansing and separation is one of the unique features of this invention and why it will be useful to restaurants, industrial facilities and car repair shops that struggle with the maintenance of grease traps and oil spills. Once trapped in the tube or mat, the product can be easily and compactly shipped to a location for disposal, incineration or further processing, including processing the materials for use as fuel.

Sewage Sludge Incineration (SSI) is becoming a safe and effective alternative around densely populated municipalities where land application of sewage sludge is less desirable. One of the benefits of the sphagnum peat FOG, or loose fuel product, absorbent tubes and mats is that they comprise a high BTU fuel that can be used to increase the efficiency of SSI processes. In addition to providing a better and more efficient way for collecting and disposal of FOG, the product can separate the higher density grease and oil so that it can be disposed of in a landfill, and/or burned as fuel in a sludge incinerator or other furnace. The preferable FOG absorbent material filled into the mat 300/400 is a specialized form of sphagnum peat "SP", mushroom compost materials, and/or orange peels. In alternative aspects, the absorbent mater is a polymeric material having oleophilic and hydrophobic properties that are ideal to absorb fat, oils, and/or grease. In this aspect, the absorbent porous, polymeric material is a polyolefinic material and more preferably a polypropylene having oleophilic and hydrophobic properties that are ideal to absorb fat, oil, and/or grease.

The advantage of the FOG process using the tube 100/200 or mat 300/400 is that it safely and cost effectively separates FOG in the grease trap before it is mixed with large volumes of water and emsulsified waste liquids. Separation after the fact is difficult and expensive.

The FOG absorbent tube 100/200 works for FOG collection because the sphagnum peat "SP", mushroom compost material, orange peel, and/or polypropylene are highly absorbent natural or polymeric materials that separate the FOG from liquids or water. In other words, each of the absorbent material has both oleophilic and hydrophobic properties. The absorbing characteristics advantageously include a combination of increased surface area and natural filtering processes, similar to that provided by charcoal or activated carbon. A slightly larger AOS in the filtering geotextile fabric will allow more of the natural absorbing and geochemical attraction between the sphagnum peat "SP" to have better contact with the surface FOG materials to attract and collect it from the liquids/water. This approach reduces the tendency or emulsification of the FOG into the grease trap so that frequency of the grease trap pumping and remixing of the FOG and water/liquid will be reduced. Collecting the FOG from the surface of the grease trap is much more efficient and cost effective.

Estimate of the absorbing qualities of peat moss appear to be in the range of 5 to 10 kg/m$^2$ per FOG tube 10 per week. This will be an area of applied research and measurement during future demonstration projects. The container, even when saturated with FOG, will float in the grease trap and prevent additional FOG from entering the sewer pipe thereby preventing FOG from entering the sewer and reducing FOG pollution.

Polar molecules have a positive charge on one end and a negative charge on the other end. Non-polar molecules do not have two electrical poles and the electrons are distributed symmetrically on both sides. FOG is composed of organic non-polar compounds. Water is a polar solvent. Only polar compounds or other polar solvents will mix with water. Therefore, non-polar FOG will not readily mix with water. Depending on the source, FOG has a density of approximately 0.863-0.926 g/cm$^3$. Water has a density of approximately 1.000 g/cm$^3$. The lesser density substance will float on top of the greater density substance if it does not mix, thus non-polar FOG floats on water because it does not mix and gravity exerts more pull on the greater density water molecules. Water molecules are relatively small because they are only composed of one oxygen and two hydrogen molecules (H$_2$O). They, therefore, pack closely together in a space. Molecules of oil are large and have complicated shapes, thus requiring more space than water molecules, which is why oil is less dense than water.

A few oils having densities less than water are known to be polar compounds and can mix with water and therefore not float on the water's surface.

Thus, polarity and density both contribute to oil floating on water.

Polarity is a relative term. On a sliding scale, some oils are more or less polar than others, and have both polar and non-polar attributions. Also, the heating of oils and interaction with other organic compounds it is exposed to during heating, can change the oil's chemical composition, and thus change the relative polarity.

The above referenced principles permit the method of this application to work as intended and as developed.

Further evidence supporting the "charge" principle is found at Fat, Oil and Grease Science, Dothan, Alabama. Fat, Oils, and Grease (FOG) Science.

Testing of FOG as described above returned a B.T.U. value of 14,019 per pound using a method identified as ASTM D240. According to a preferred embodiment of the invention, the FOG product contains between 88-75 percent FOG and between 12 and 25 percent peat or mushroom solids as described above. Expected range of B.T.U. output is 12,500 to 15,500 B.T.U. per pound, preferably approximately 14,000 B.T.U. The biofuel can be transported in its original container and subsequently compressed into a pellet, or log or other shape, shredded or granulated to increase its surface area and render it more easily combustible. In an alternate embodiment, as described further below, the biofuel may be transported by a vacuum truck or other suitable vehicle and subsequently burned at a burning facility.

Motor vehicle oils similarly incorporated into the FOG product can produce in the range of 20,000 B.T.U. per pound.

Figure 5:
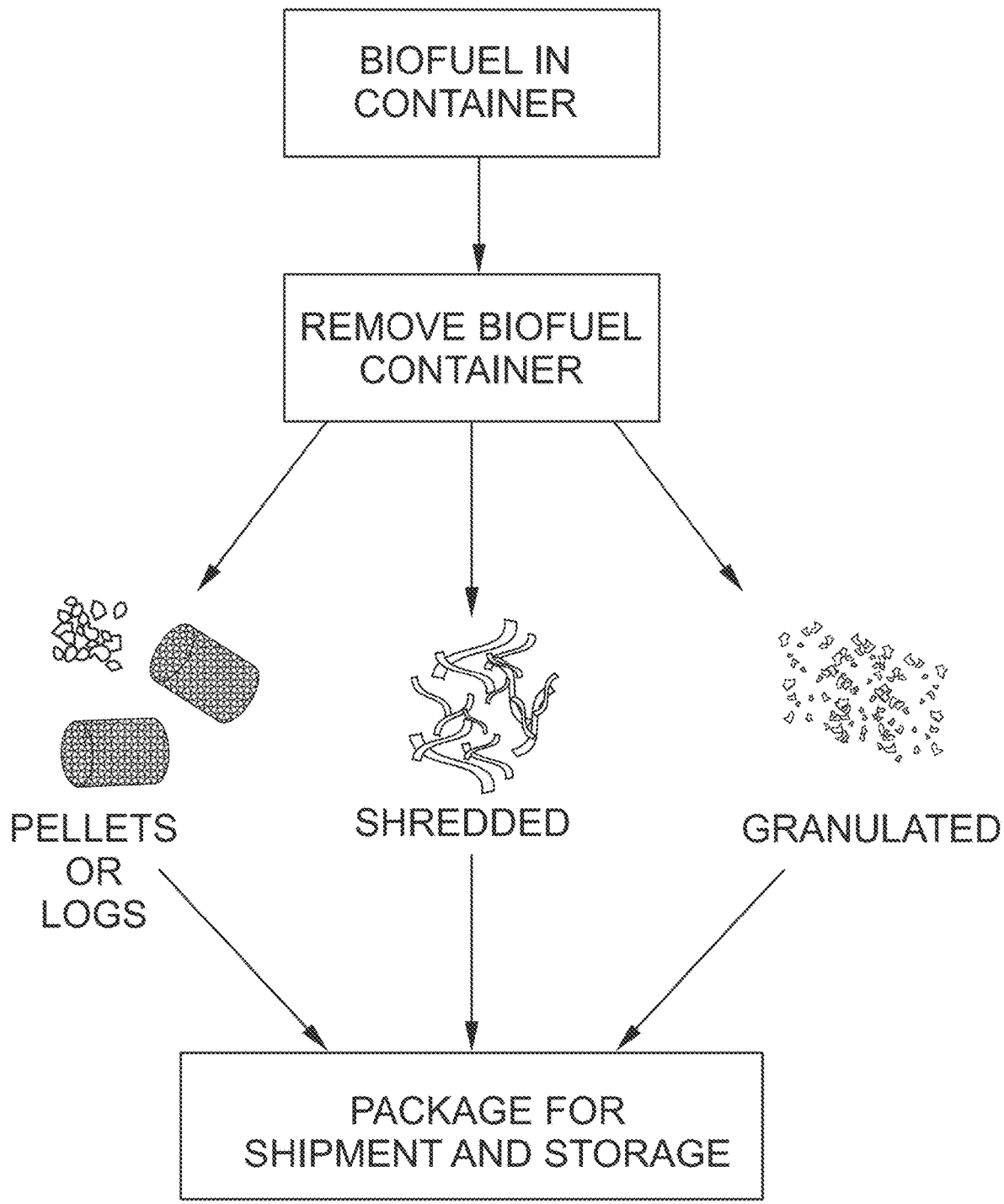
FIG. 5 schematically illustrates the processes by which the biofuel is processed into various end use configurations.

If the FOG is originally collected in a synthetic container, transferring the FOG into some form of container of natural materials, as described above, means that the entire product, FOG, capture material, and container can be used as fuel. As is apparent from the above discussion, the FOG/capture material product can be removed from its formation container for being compressed into a pellet, log, cake or other shape, shredded or granulated, or may remain in its formation container for being combusted, as illustrated in FIG. 5. In some embodiments, the FOG is not transferred into a container of capture materials, but rather captured or collected using a vacuum truck or other suitable vehicle having either a capture material already within the tank of the truck, or at the burning facility where the FOG will be transferred to be used as fuel once mixed with one or more mixing components with the absorbent mater or polymeric material having oleophilic and hydrophobic properties that are ideal to absorb fat, oils, and/or grease.

Figure 6:
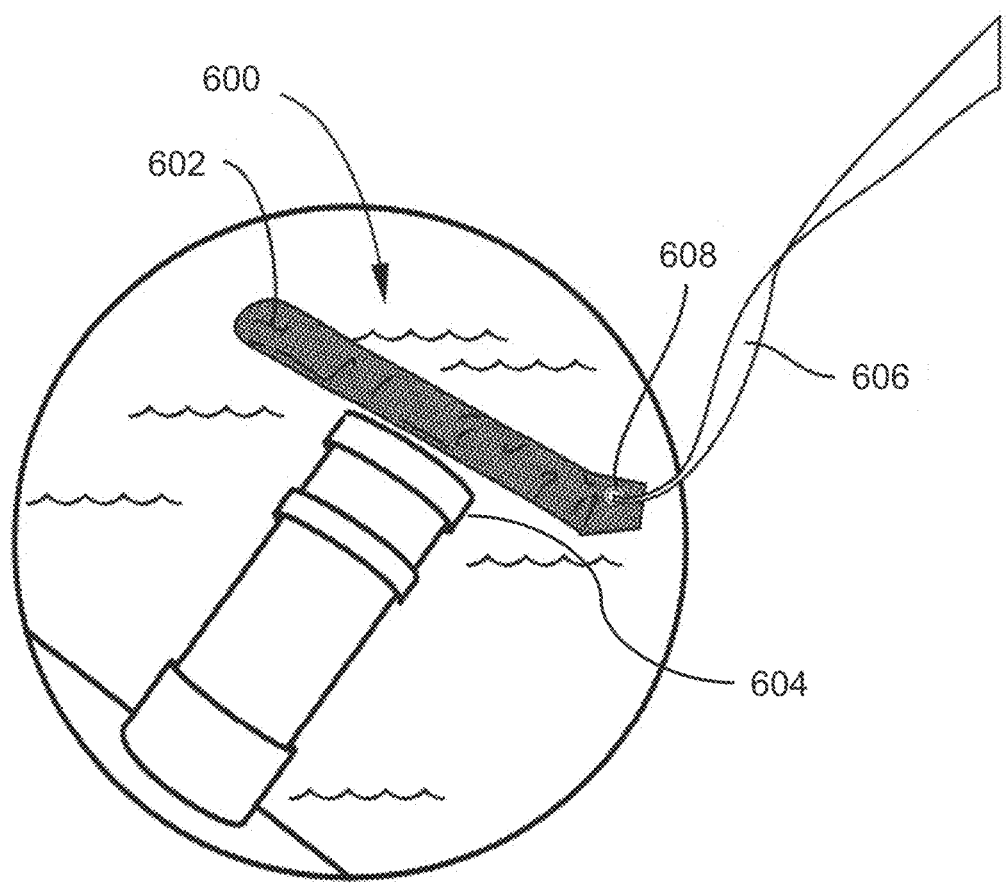
FIG. 6 is a cross-sectional view that shows the location of the absorbent mat in a cross section of a typical grease trap at a restaurant or auto maintenance facility.

FIG. 6 illustrates placement of a tube 602 in a grease trap 600 proximate to an entrance to the grease trap and tethering the tube 602 with the cord 606 as described above to remain proximate to the grease trap entrance 604. The cord is attached to the openings 608 that are located on either or both ends of the tube.

Figure 7:
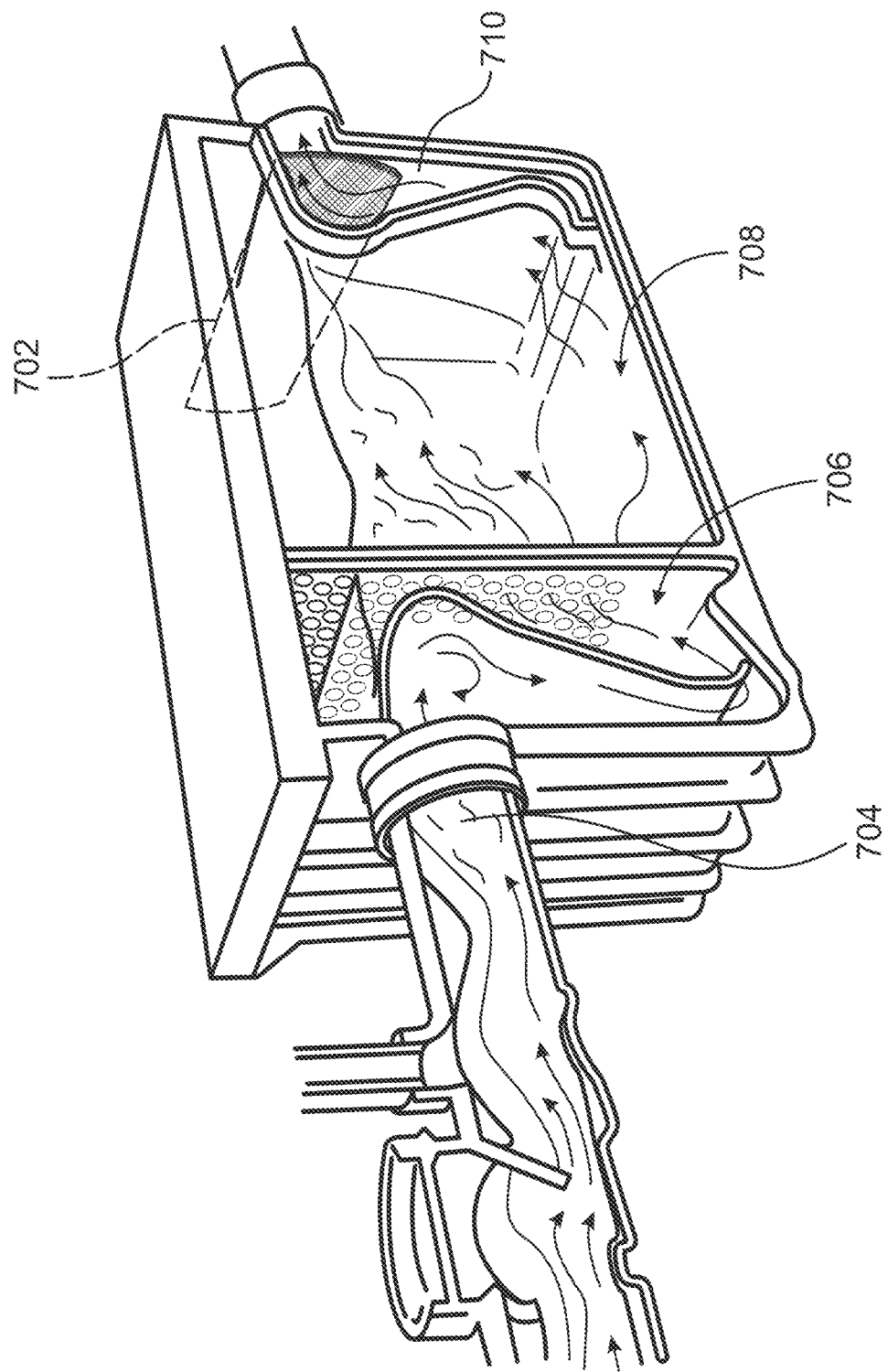
FIG. 7 is an illustration of a typical restaurant grease trap showing placement and use of the geotextile tube to absorb FOG.

FIG. 7 illustrates placement of the tube 702 in a grease trap 700 relative to other components of a conventional grease trap structure. In some embodiments, the grease trap has a primary compartment 707 and a secondary compartment 708. The tube may be placed proximate to the grease trap entrance 704 in the primary compartment 707. The tube in the primary compartment may be freely floating, alternatively the tube may be tethered to the grease trap to remain proximate the entrance, or proximate to the secondary compartment. The tube 702 may be placed proximate to the grease trap exit 710 in the secondary compartment 708. The tube 702 may be tethered with the cord 706 to remain proximate to the grease trap exit 710 in the secondary compartment. In some embodiments, the tube will move from the primary compartment 707 to the secondary compartment 708.

The following step by step process is expected for typical use and implementation of the FOG product and collection process. The process is explained with reference to the tube 100/200, but will be essentially the same when using the mat 300/400.

STEP 1: Introduce the tube 100/200 with selected sphagnum peat "SP" or mushroom compost (as the absorbent material 204) into the grease trap or other FOG collection structure. Tether the tube with cord so that it stays at the influent end of the grease trap, and is the optimal location of FOG collection. Prior to placement in the grease trap, weigh the dry tube so that a 'before and after" measure of FOG collection can be established.

STEP 2: After consultation with local water and sewer regulatory officials and the owner of the FOG collection device or grease trap, setup of a regular interval to remove and replace the FOG collection absorbent tube. From past experience, the best way to initiate the use of the FOG remediation technology is to start off as a regulatory approved Demonstration Project where the approach and results are measured and evaluated.

STEP 3: Depending on the interval for removal and collection of the FOG absorbent tube, arrange for storage in covered and secured FOG containers to avoid attracting small animals and rodents that are common in and around restaurants and vehicle repair facilities.

STEP 4: Transport the FOG tubes to an SSI facility. The FOG tube is then part of waste to energy, renewable energy biofuel source.

In other embodiments, the FOG absorbent material may be used alone (i.e., excluding the previously mentioned container that contains the absorbent material and/or the absorbent material separated from the container) to absorb FOG when forming/producing the biofuel product (i.e., the absorbent material having FOG absorbed therein). When used in this manner, a user (e.g., technician) places a desired, predetermined amount of absorbent material within, for example, a grease trap (or other container having FOG therein). The user then allows an adequate time for the absorbent material to absorb and preferably become saturated with FOG thereby forming the biofuel product. Subsequently the user removes the biofuel product from, for example, the grease trap for subsequent use and/or processing steps to be used as the biofuel product. During the removal step of the biofuel product (i.e., absorbent material having FOG absorbed therein) in the above mentioned process, it is further envisioned that a positive pressure pump (e.g., a modified pool pump such as the Pentair line of pool pumps) and other removal aids (e.g., a net, filter, vacuum truck, etc.) will be used to further expedite the overall process to remove the biofuel from the grease trap in an expeditious and efficient manner.

To further aid in the removing/removal steps (i.e., removing the biofuel comprising the absorbent material having FOG absorbed therein), additional removal tools and aids may be used. For example, the technician may use a rake or rake-like device to actuate the absorbent material, FOG, and/or brown water in the grease trap and to spread the absorbent material more evenly on the surface of the FOG/water mixture within the grease trap. Alternatively, the technician may use a hose from a vacuum truck to collect the FOG. This step advantageously increases the rate of absorption into the absorbent material and further expedites the FOG capture and removal process from the grease trap. During this step, the absorbent material having FOG absorbed therein is hydrophobic and will continue to float even when saturated with FOG.

At this point, the technician may further utilize a positive pressure pump (a modified pool pump such as the Pentair line of pool pumps, or a vacuum truck) to pump the biofuel (i.e., FOG laden absorbent material) from the top, or uppermost, portion of the grease trap and to remove the biofuel therefrom via a filter and/or physically remove (e.g., via a net or another similar removal device). During the removal process and while using the pump or vacuum truck, the pump/vacuum truck will beneficially circulate the brown water back into the grease trap thereby keeping the grease trap maximally efficient and effective. The maximum efficiency of the grease trap is achieved by keeping the grease trap full of water during the removal process.

While pumping the FOG laden absorbent material out of the grease trap, the technician moves the end of the hose around the top and/or uppermost sections of the grease trap surface until all of the biofuel (i.e., absorbent material having FOG absorbed therein) has been removed from the grease trap.

After the biofuel (i.e., absorbent material laden with FOG and/or absorbent material having FOG absorbed therein) has been captured and removed from the grease trap and the unencumbered water drained from the positive pressure pump hoses into the grease trap, the grease trap lid is closed securely. Then the technician either transports the biofuel to another location or leaves the biofuel in a secure area for subsequent removal and processing.

A biofuel product having fat, oil and/or grease components according to the invention has been described with reference to specific embodiments and examples. Various details of the invention may be changed without departing from the scope of the invention.

Figure 8:
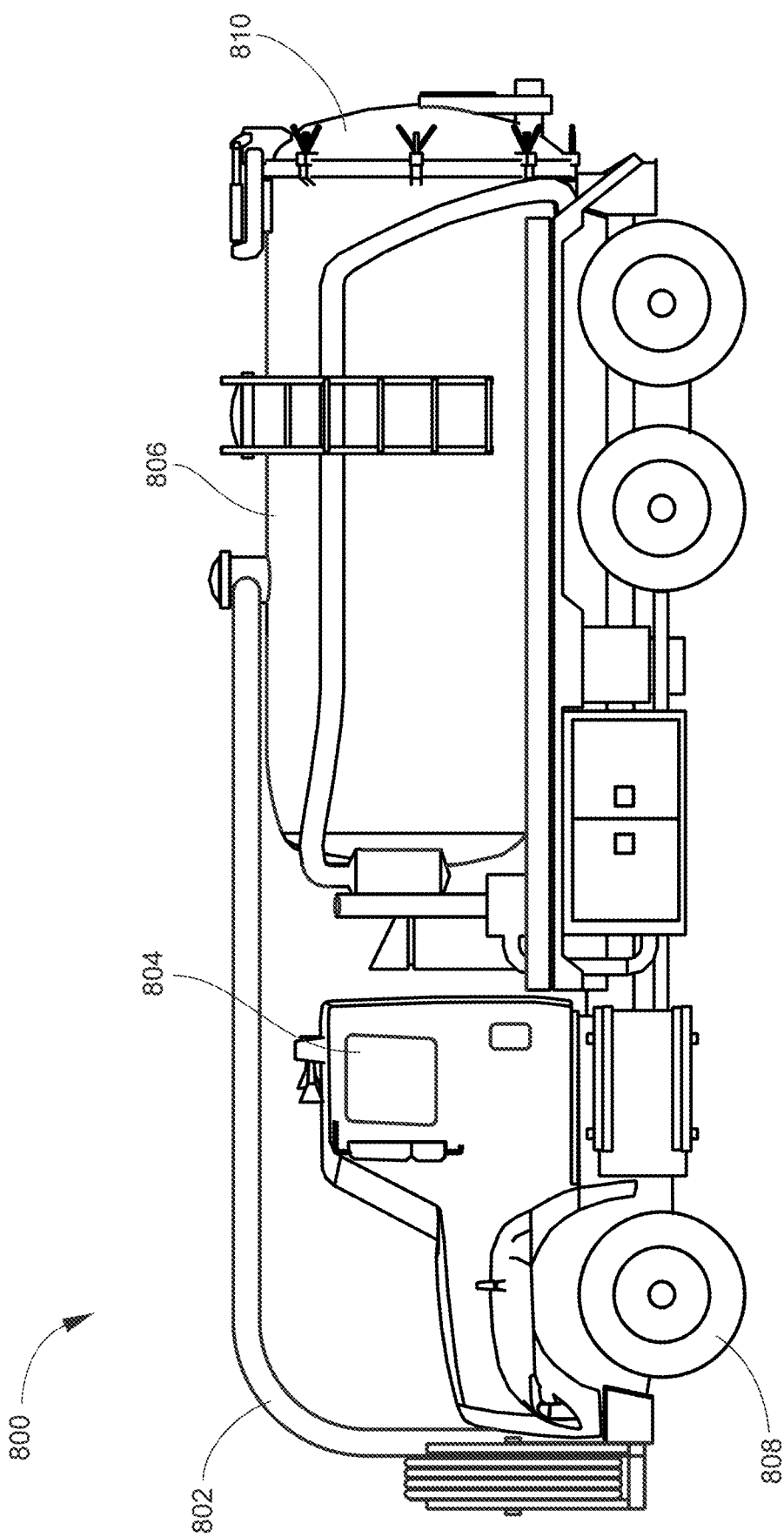
FIG. 8 is a side view of an exemplar vehicle that may be used in collecting fats, oils, and grease from a grease trap.

In still further alternative embodiments, and in view of FIG. 8, the technician may open the grease trap's lid, but rather than introducing the loose absorbent material, the technician inserts a hose 802 or other vacuum component of a vacuum truck 800 into the grease trap to capture and collect the FOG to transport it to a burn facility or other centralized location. In particular embodiments, the vacuum truck 800 or mobile FOG transportation vehicle includes a driver/passenger cabin 804, a tank 806 for containing the FOG, one or more wheels 808, a vacuum hose or other inlet device 802, and an outlet 810 for discharging or removing the FOG from the vehicle. The vacuum truck includes, as may be known and/or understood in the art, the following features generally including but not limited to safety features, a debris tank body, a vacuum system, a water system, a boom system, a tailgate system, a boom tube, a receiver tank as stated, a separator, a filter, a suction source, one or more safety valves, at times an integrate vapor recovery system, one or more additional intakes with internal pipes, a grounding reel, in some embodiments—an air cooled pump, one or more adjustable hose hooks, one or more hose reels, one or more discharge valves, a tank level indicator, sight eyes, vacuum/pressure gauge, manway/hatch/portal, vacuum relief valve, pressure relief valve, primary shutoff, secondary shutoff, float ball, vacuum pump, oil catch muffler/oil separator, precision controls, tank rails, grit ridder, blower/moisture trap and grit ridder, moisture trap, fresh water tank, storage or hybrid attachments/wands/hoses, manual and hydraulic door locks and lifts, standard chassis, vacuum blower, among other components.

Figure 9:
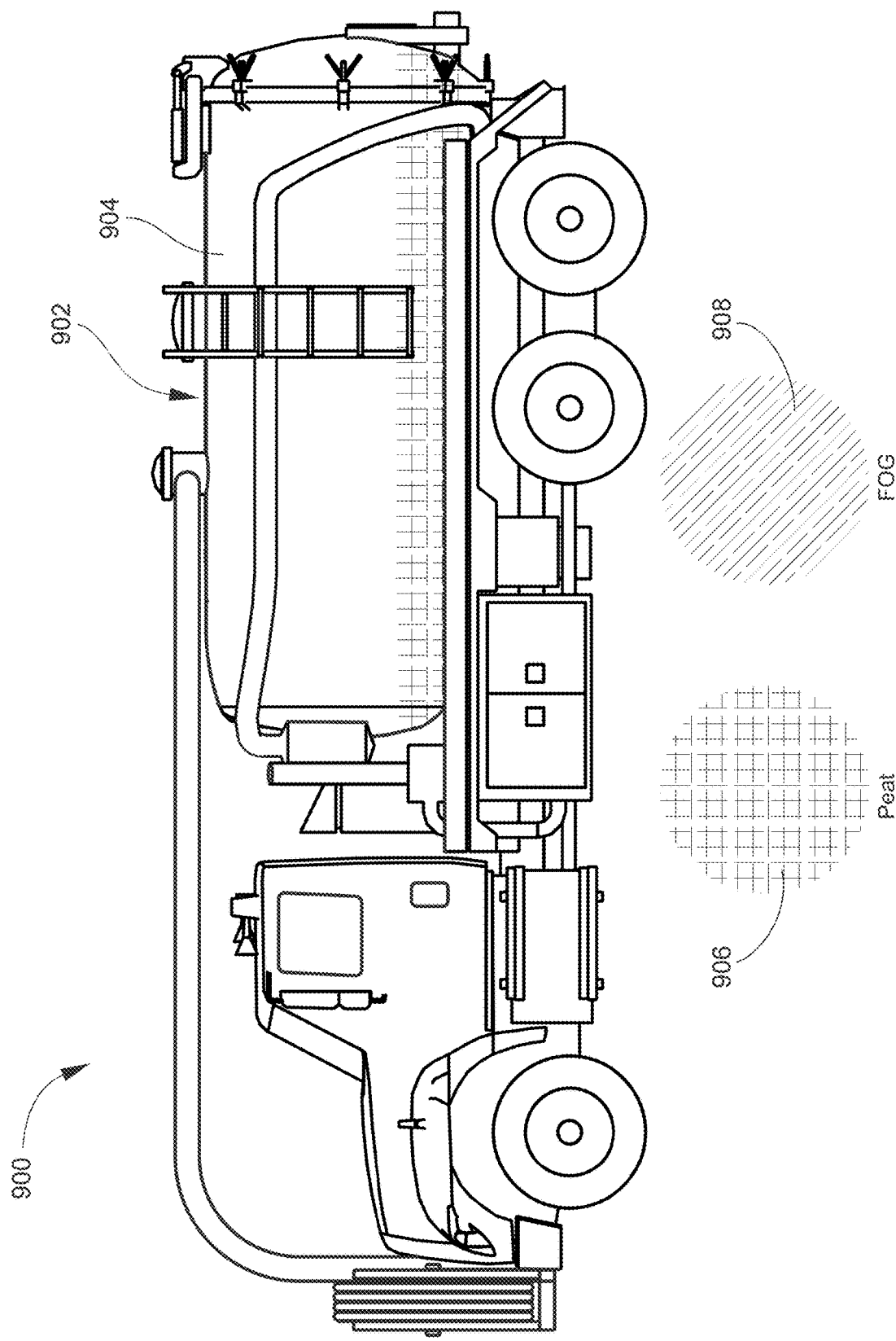
FIG. 9 is a side view of the vehicle of FIG. 8 containing a quantity of sphagnum peat material or other absorbent material within a tank of the vehicle.

According to example embodiments, the vacuum truck 900, as shown in FIG. 9, includes a preferred amount of peat or other absorbent material within the recovery tank 902 of the vehicle. The amount of loose peat or other absorbent material 906 may be determined, similar to above, by calculating the specific vehicle's tank size based on capacity and carrying weight. In some embodiments, the amount of loose peat or other absorbent material 906 may account for approximately ⅕-⅘ of the available space 904 in the tank, more particularly, between about ⅖-⅘, for example about ⅘, or as predetermined to allow full use of the space with absorbent material. In other embodiments, the amount of loose peat or other absorbent material 906 will be proportionate to the amount of FOG 908 that needs to be vacuumed as well as the capabilities (or limitations) of the particular vacuum truck 900 being used.

Figure 10:
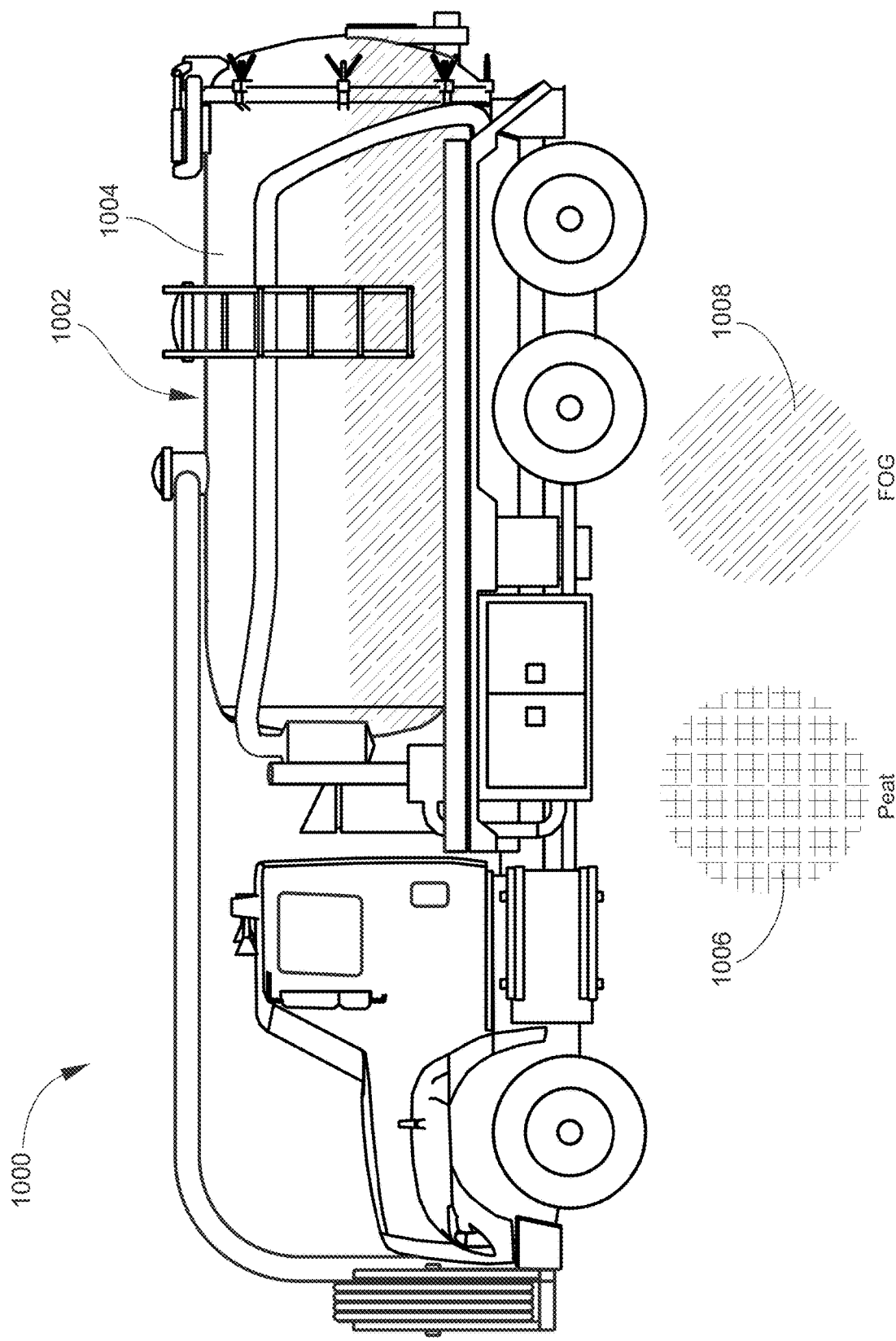
FIG. 10 is a side view of the vehicle of FIG. 8 containing a quantity of fats, oils, and grease ("FOG") within the tank of the vehicle.

In alternate embodiments, as shown in FIG. 10, the vacuum truck 1000 may simply be used to collect the FOG 1008 and transport it to the burn or other processing facility where it can be mixed with peat or another absorbent material 1006 to create the biofuel or alternatively where it can be used as a feedstock for biodiesel. Similar to determining the amount of loose peat or other absorbent material 1006 that may fill the available space 1004 in the tank, the vacuum truck 1000 may also be limited on its capacity for carrying FOG 1008 and/or the proportion of FOG collected may be determined by how much peat it will be mixed with at the burn or other processing facility.

Figure 11:
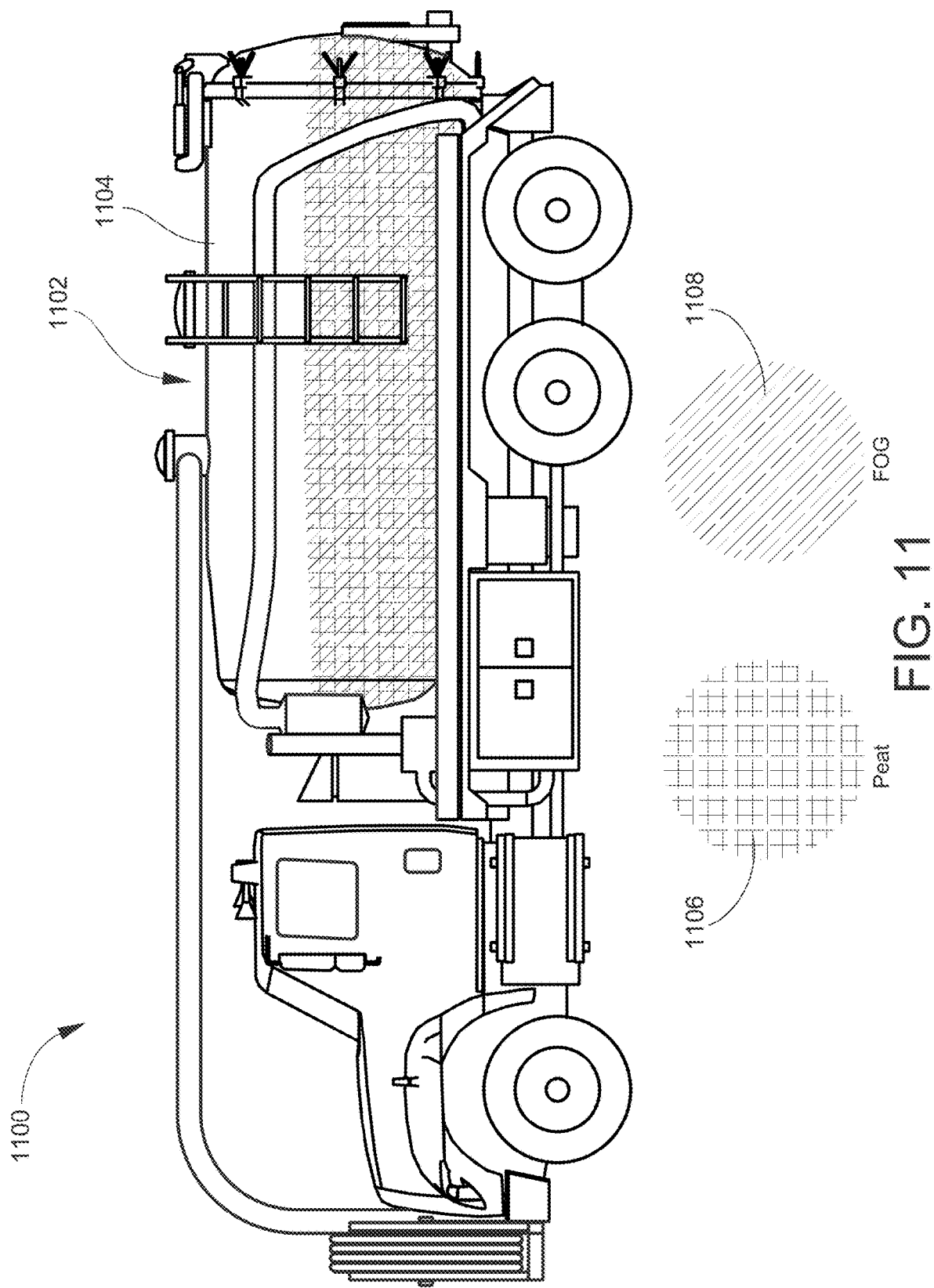
FIG. 11 is a side view of the vehicle of FIG. 8 containing a quantity of sphagnum peat material or other absorbent material and a quantity of fats, oils, and grease ("FOG") within the tank of the vehicle, which combine to create the biofuel.
Figure 12:
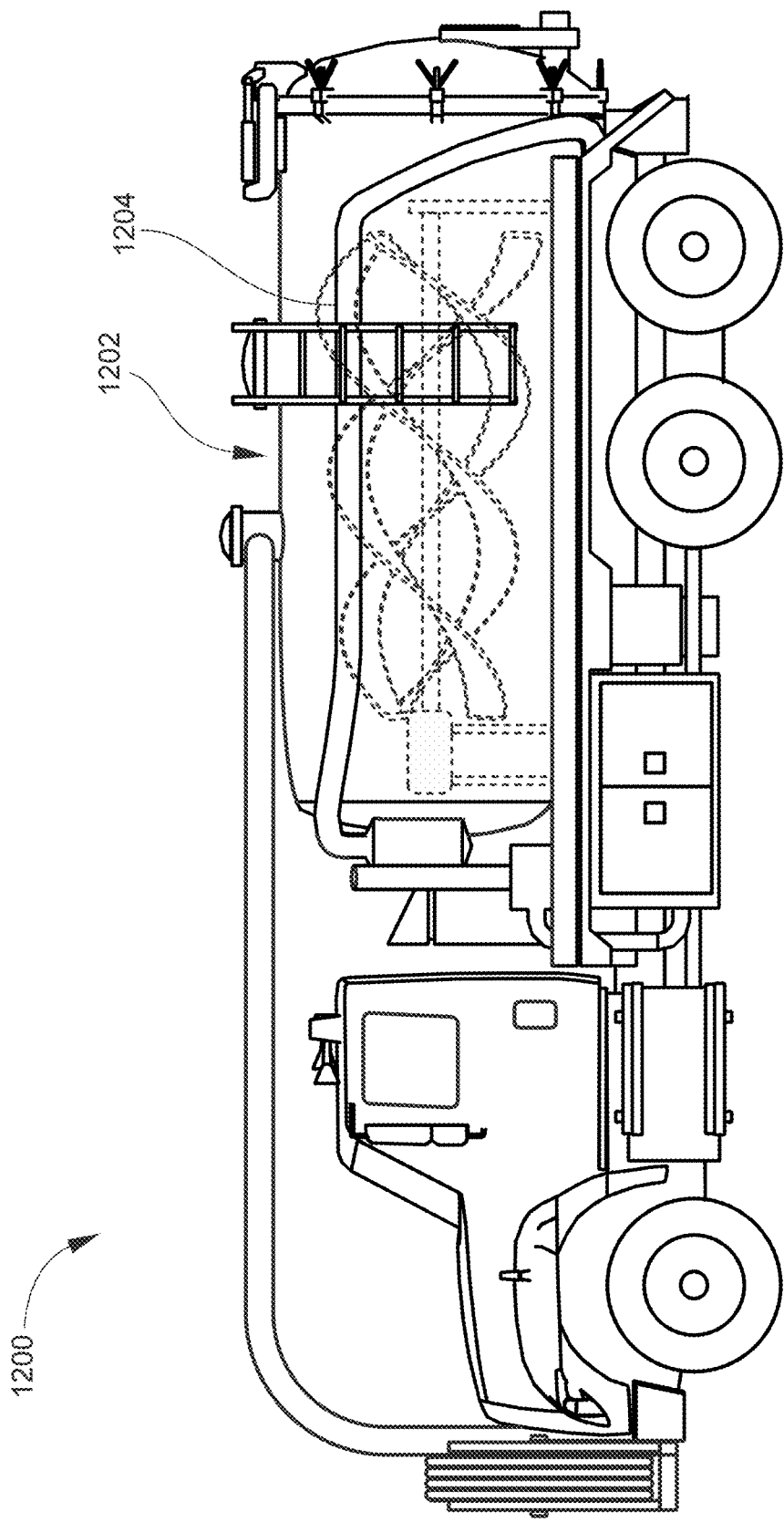
FIG. 12 is a side view of the vehicle of FIG. 8 illustrating an exemplary mixing element located within the tank of the vehicle.

Upon vacuuming the FOG 1108, as shown in FIG. 11, from the grease trap, the absorbent material 1106 and the FOG 1108 are combined to create the biofuel (i.e., absorbent material laden with FOG and/or absorbent material having FOG absorbed therein). The FOG 1108 and absorbent material 1106 may be combined by various mixing elements or components 1204 (see FIG. 12) that stir and/or move the FOG until it is generally fully absorbed by the loose peat or other suitable absorbent material.

Figure 13:
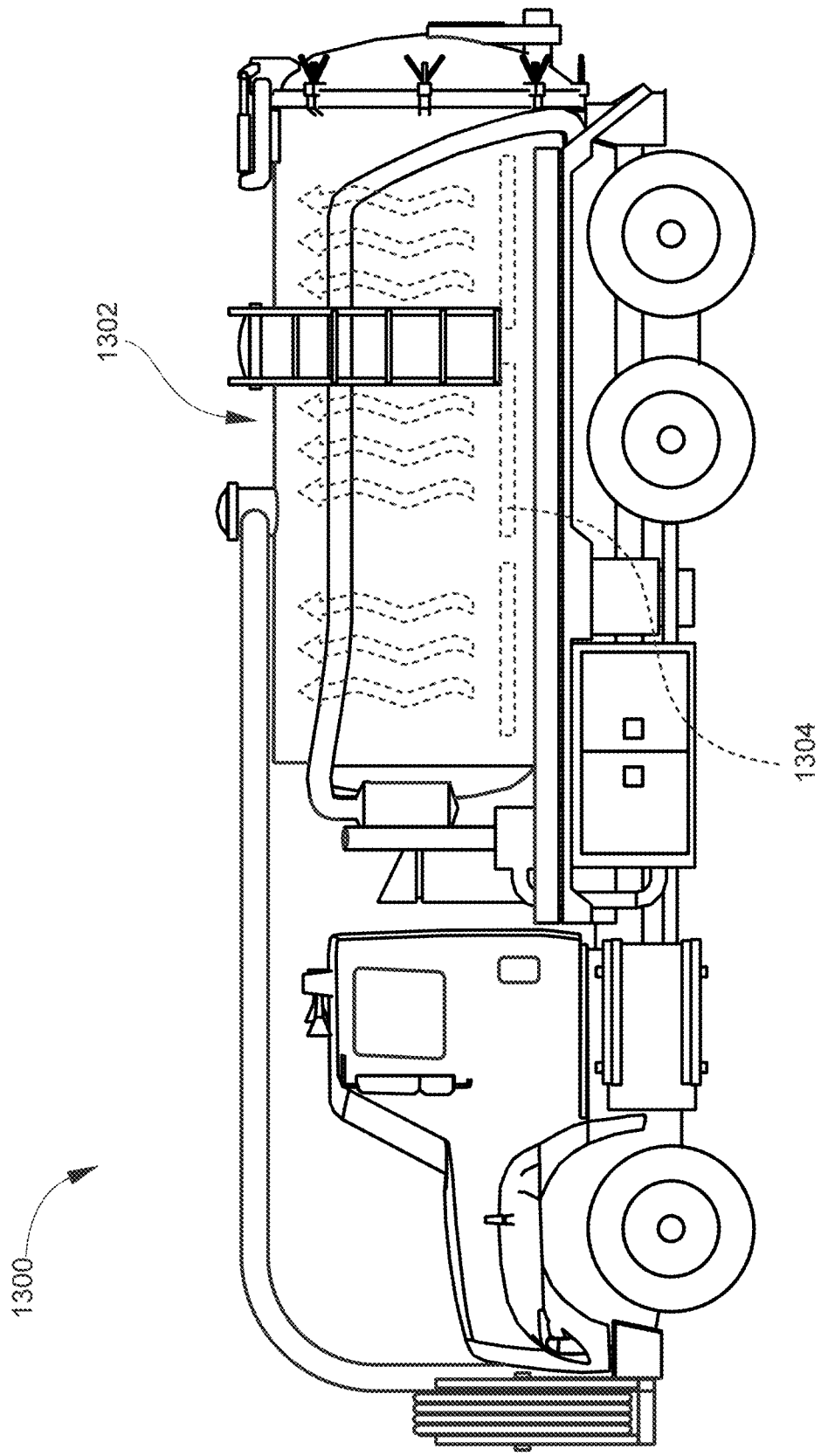
FIG. 13 is a side view of the vehicle of FIG. 8 illustrating an exemplary heating element located within the tank of the vehicle.

In some embodiments, the mobile FOG transportation vehicle 1300 may further include one or more heating elements 1304, as shown in FIG. 13. Additionally, the vacuum truck 1300 may be filled with a proportionate amount of loose peat or another absorbent material, as detailed above, prior to a technician utilizing the vehicle to extract the FOG from a grease trap. In various embodiments, the mobile FOG containment vehicle 1300 may include a heating element 1304 within or directly coupled to the tank 1302 of the vehicle in order to prevent the FOG and/or FOG biofuel from congealing while it is transported to a burn or other processing facility or from congealing while capillary absorption process ensues to create the mixing process. In particular embodiments, the heating elements 1304 keep the FOG from congealing by keeping the temperature between about 100° F.-250° F., or more preferably about 110° F.-200° F., for example about 130° F.-150° F. After transporting the FOG or FOG fuel to a burn facility, for example, the FOG/FOG fuel is removed or discharged from the vehicle via the outlet and subsequently burned.

Figure 14:
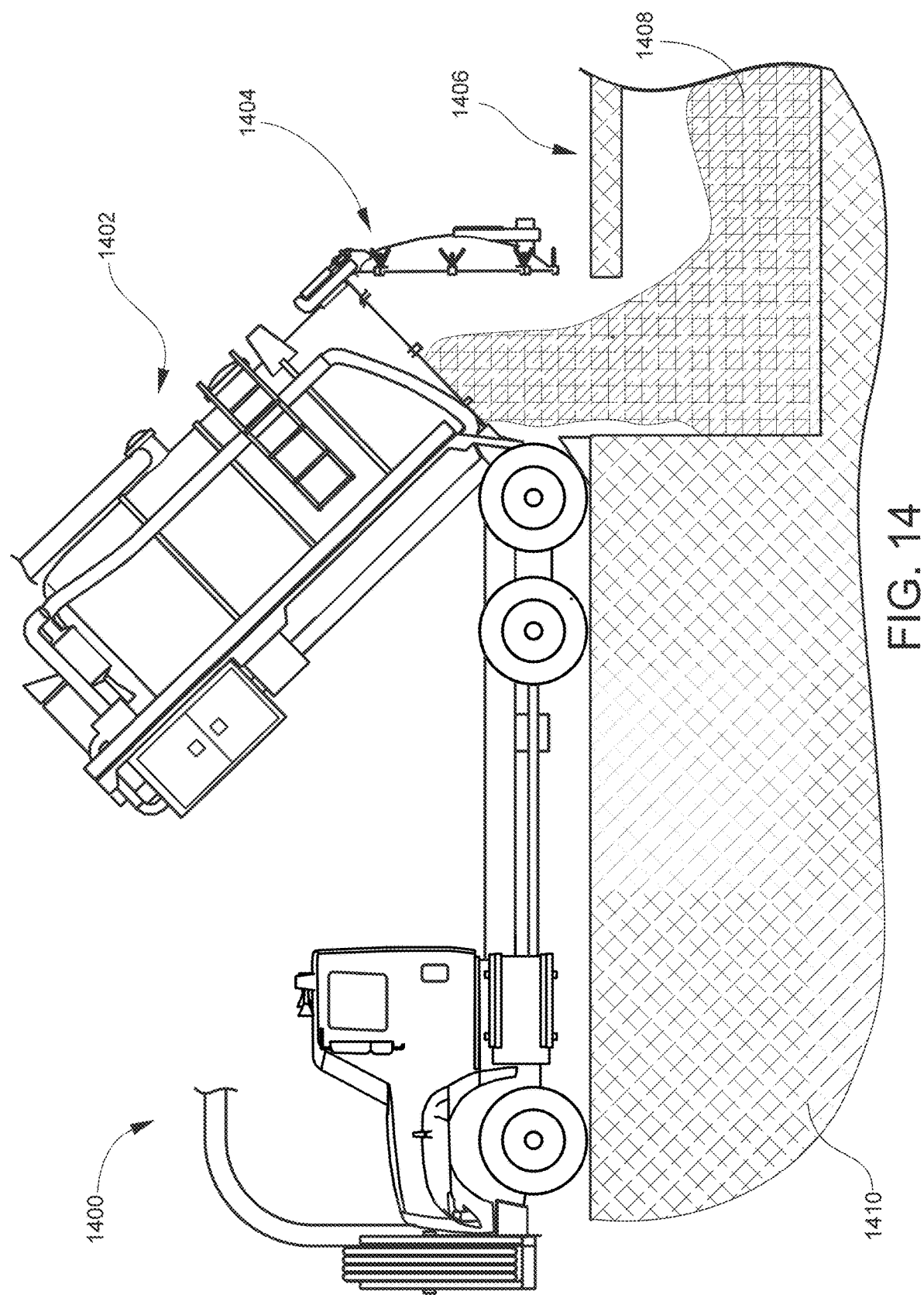
FIG. 14 is a side view of the biofuel of FIG. 11 being deposited into a collection container for later use and/or processing of the biofuel.

Referring to FIG. 14, in some embodiments, the FOG fuel (i.e., biofuel) 1408 or similarly the FOG may be discharged by the tank 1402 such that the FOG fuel may be released from the tank of the vehicle 1400 into a capture device 1406 at the particular facility that houses the absorbent material 1410. In other embodiments, a drain or other hose may be used to allow the FOG fuel to be drained from the vehicle.

Figure 15:
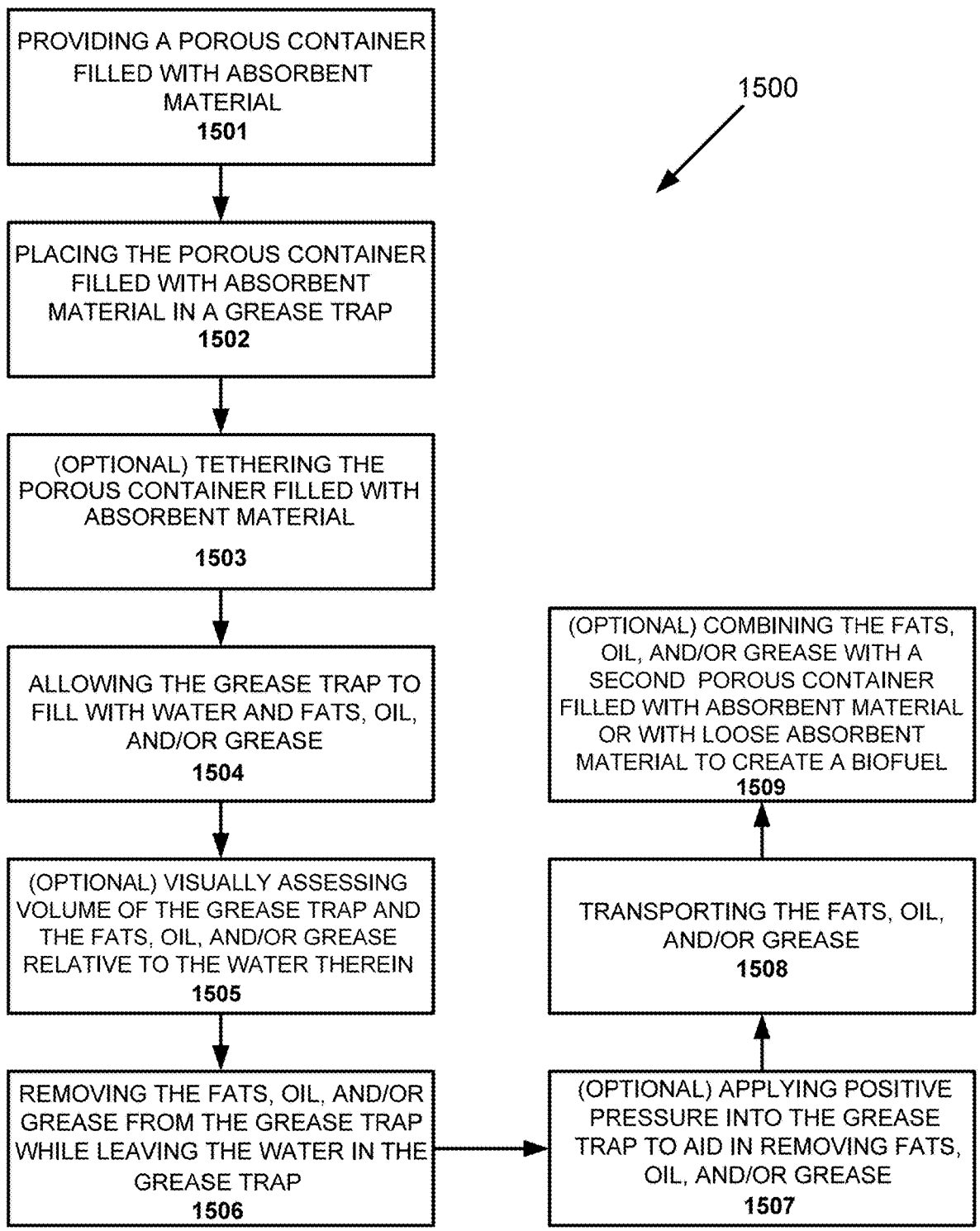
FIG. 15 schematically depicts a method of the FOG removal from, for example, a grease trap using the disclosed absorbent material(s).

FIG. 15 illustrates a block diagram of a method 1500, in accordance with an embodiment of the present invention. At block 1501, the technician provides a porous container filled with absorbent material capable of absorbing a quantity of FOG through the porous fabric of the porous container in the grease trap. At block 1502, the porous container filled with absorbent material is placed in the grease trap. The porous container may be positioned in a primary compartment of the grease trap. Preferably, the porous container with absorbent material is positioned in a secondary compartment of the grease trap. In addition, the technician may periodically remove the porous container with the absorbent material and replace with a new porous container and new absorbent material. This process may be repeated multiple times to ensure the FOG from the grease trap is absorbed. At block 1503, the technician may tether the porous container with the absorbent material proximate to the FOG in the grease trap. The porous container may be tethered near the grease trap entrance in the primary compartment and/or the grease trap exit in the secondary compartment where the FOG laden water exits to the sewer line whether in front of a horizontal pipe or in front of the entrance to a standpipe. Most preferably, the porous container with absorbent material is tethered, or otherwise secured in place, proximate or within the exit to the sewer to ensure that the water must pass through the porous container and the absorbent material therein prior to entering the sewer. At block 1504, the grease trap is allowed to fill with water and fats, oil, and/or grease. At block 1505, the technician may visually assess the volume of the grease trap and the fats, oil, and/or grease relative to the water therein.

At block 1506, the technician removes the fats, oil, and/or grease from the grease trap while leaving the water in the grease trap. Removing only the FOG from the grease trap will keep the grease trap maximally efficient and effective. The maximum efficiency of the grease trap is achieved by keeping the grease trap full of water during the removal process. Without the water, the subsequent FOG would merely sit at the bottom of the grease trap and eventually rise into the secondary container and exit through the sewer via the sewer pipe. Reducing FOG pollution is critical as FOG can cause blockages and disrupt sewage treatment processes when introduced into sewage systems. The presence of water allows the technician to easily remove only the FOG from the grease trap and prevents the FOG from entering the sewer.

At block 1507, the technician may apply positive pressure into the grease trap to aid in removing FOG. The technician can insert a positive pressure pump into the mixture of separated water and FOG to aid and facilitate removing the FOG from the grease trap by maintaining the FOG on an uppermost surface of the separated water that remains in the grease trap. At block 1508, the technician transports the FOG. The FOG may be transported to a secondary location such as a processing facility or burn facility. A vehicle (e.g., vacuum truck) containing absorbent material may remove the FOG from the grease trap, through a vacuum hose, and form the biofuel within a tank of the vehicle by combining the FOG with the absorbent material within the tank. The tank of the vacuum truck may have a second porous container and second batch of absorbent material, loose absorbent material, or a combination thereof. At block 1509, the technician can combine the FOG with a second porous container filled with absorbent material (i.e., second batch of absorbent material) or with loose absorbent material to create a biofuel. The FOG may be taken to a secondary location to be used as feedstock for biodiesel.

The porous container filled with absorbent material may be changed out at regular intervals determined by the user, the municipality, or other authority. Once the porous container filled with absorbent material is saturated with FOG it will not inhibit the flow of water into the sewer pipe but will continue to inhibit the flow of FOG into the sewer, thus keeping the FOG in the grease trap for regular removal.

Furthermore, the foregoing description of the preferred embodiments of the invention and best mode for practicing the invention are provided for the purpose of illustration only and not for the purpose of limitation of the invention being defined by the claims.

What is claimed is:

1. A method of capturing and disposing of fats, oil and/or grease, the method comprising the steps of:
   (a) providing a porous container formed of a porous fabric, wherein the porous container comprises a plurality of pores with an apparent opening size (AOS) of 0.25 mm to 0.5 mm, and wherein the porous container is filled with an absorbent material capable of absorbing a quantity of the fats, oil, and/or grease through the porous fabric of the porous container, wherein the absorbent material is selected from the group consisting of sphagnum peat, mushroom compost, and combinations thereof;

(b) placing the porous container and the absorbent material contained therein in a grease trap;

(c) allowing the grease trap to fill up with water and a mixture of fats, oil, and/or grease;

(d) after a period of time, removing the fats, oil, and/or grease from the grease trap, while the water of step (c) remains in the grease trap; and (e) transporting the fats, oil, and/or grease.

2. The method of claim 1, wherein placing the porous container and the absorbent material contained therein in the grease trap comprises placing the porous container and the absorbent material contained therein in a secondary compartment of the grease trap.

3. The method of claim 2, wherein the porous container and the absorbent material contained therein in is tethered to the secondary compartment of the grease trap.

4. The method of claim 1, wherein the grease trap has a heterogeneous mixture of separated water and fats, oil, and/or grease therein.

5. The method of claim 1, further comprising tethering the porous container and the absorbent material contained therein proximate to the fats, oil, and/or grease in the grease trap.

6. The method of claim 1, further comprising periodically removing the porous container and the absorbent material contained therein and replacing with a new porous container and new absorbent material contained therein.

7. The method of claim 1, further comprising, before step (d), visually assessing a volume of the grease trap and the fats, oil, and/or grease relative to the water therein to determine an amount of the fats, oil, and/or grease to be removed from the grease trap.

8. The method of claim 1, wherein step (d) further comprises applying a positive pressure using a positive pressure pump into the mixture of separated water and fats, oil, and/or grease therein to aid and facilitate removing the fats, oil, and/or grease from the grease trap by maintaining the fats, oil, and/or grease on an uppermost surface of the separated water that remains in the grease trap.

9. The method of claim 1, further comprising, after step (e), combining the fats, oil, and/or grease from the grease trap with a second porous container and second batch of absorbent material contained therein at a secondary location, thereby forming a biofuel, the biofuel comprising the second batch of absorbent material and the fats, oil, and/or grease absorbed therein.

10. The method of claim 1, further comprising, after step (e), combining the fats, oil, and/or grease from the grease trap with loose absorbent material at a secondary location, thereby forming a biofuel, the biofuel comprising the loose absorbent material selected from the group consisting of sphagnum peat, mushroom compost, and combinations thereof and the fats, oil, and/or grease absorbed therein.

11. The method of claim 1, wherein removing the fats, oil, and/or grease from the grease trap comprises vacuuming the fats, oil, and/or grease using a vacuum house of a vacuum truck; wherein transporting the fats, oil, and/or grease comprises transporting the fats, oil, and/or grease within a tank of the vacuum truck.

12. The method of claim 11, further comprising, after step (d), combining the fats, oil, and/or grease from the grease trap with a second porous container and second batch of absorbent material contained therein in the vacuum truck, thereby forming a biofuel, the biofuel comprising the second batch of absorbent material and the fats, oil, and/or grease absorbed therein.

13. The method of claim 11, further comprising, after step (d), combining the fats, oil, and/or grease from the grease trap with loose absorbent material in the vacuum truck, thereby forming a biofuel, the biofuel comprising the loose absorbent material selected from the group consisting of sphagnum peat, mushroom compost, and combinations thereof and the fats, oil, and/or grease absorbed therein.

14. A method of capturing and disposing of fats, oil and/or grease, the method comprising the steps of:

(a) providing a porous container formed of a porous fabric, wherein the porous container comprises a plurality of pores with an apparent opening size (AOS) of 0.25 mm to 0.5 mm, and wherein the porous container is filled with an absorbent material capable of absorbing a quantity of fats, oil, and/or grease through the porous fabric of the porous container, wherein absorbent material is selected from the group consisting of sphagnum peat, mushroom compost, and combinations thereof;

(b) placing the porous container and the absorbent material contained therein in a grease trap;

(c) allowing the grease trap to fill up with water and a mixture of fats, oil, and/or grease;

(d) after a period of time, removing the fats, oil, and/or grease from the grease trap using a vacuum truck, while the water of step (c) remains in the grease trap; and (e) transporting the fats, oil, and/or grease using the vacuum truck.

15. The method of claim 14, wherein the vacuum truck comprises a tank comprising i) a vacuum hose, ii) an inlet to the tank, iii) an outlet from the tank, and iv) one or more mixing components.

16. The method of claim 15, wherein the tank further comprises one or more heating elements for warming contents within the tank to prevent the contents from congealing.

17. The method of claim 16, wherein the vacuum truck comprises a second porous container with a second batch of absorbent material contained therein, loose absorbent material, or a combination thereof.

18. The method of claim 17, further comprising, after step (e), discharging the contents of the vacuum truck at a secondary location, wherein the contents of the vacuum truck comprise a biofuel; the biofuel comprising the second porous container with the second batch of absorbent material contained therein, the loose absorbent material, or a combination thereof and the fats, oil, and/or grease absorbed therein.

19. The method of claim 14, further comprising, after step (e), discharging the contents of the vacuum truck into a containment device containing the second porous container with the second batch of absorbent material contained therein, the loose absorbent material, or a combination thereof at the secondary location, thereby forming a biofuel; the biofuel comprising the second porous container with the second batch of absorbent material contained therein, the loose absorbent material, or a combination thereof and the fats, oil, and/or grease absorbed therein.

* * * * *